(12) United States Patent
Goldman

(10) Patent No.: US 9,758,080 B2
(45) Date of Patent: Sep. 12, 2017

(54) MAGNETIC BOTTLE MOUNTING SYSTEM AND METHODS OF USE

(76) Inventor: Anthony R. Goldman, Columbia, SC (US)

( * ) Notice: Subject to any disclaimer, the term of this patent is extended or adjusted under 35 U.S.C. 154(b) by 0 days.

(21) Appl. No.: 13/462,631

(22) Filed: May 2, 2012

(65) Prior Publication Data

US 2012/0280096 A1    Nov. 8, 2012

Related U.S. Application Data

(60) Provisional application No. 61/518,174, filed on May 2, 2011, provisional application No. 61/571,254, filed on Jun. 23, 2011, provisional application No. 61/631,674, filed on Jan. 9, 2012.

(51) Int. Cl.
| | | |
|---|---|---|
| *A47B 96/00* | (2006.01) | |
| *B60N 3/10* | (2006.01) | |
| *B62J 11/00* | (2006.01) | |

(52) U.S. Cl.
CPC .............. *B60N 3/101* (2013.01); *B62J 11/00* (2013.01); *Y10T 29/49815* (2015.01)

(58) Field of Classification Search
CPC .... B62J 11/00; B60N 3/101; Y10T 29/49815; B65D 23/104
USPC ............... 248/224.8, 311.2, 318, 312.1, 315; 224/400, 412, 414, 415, 425, 148.4, 224/148.7; 215/386–399, 900, 382, 383
See application file for complete search history.

(56) References Cited

U.S. PATENT DOCUMENTS

| | | | | |
|---|---|---|---|---|
| 4,282,279 A | * | 8/1981 | Strickland .............. | B65D 25/34 150/901 |
| 4,570,835 A | | 2/1986 | Criqui et al. | |
| 5,115,952 A | * | 5/1992 | Jenkins ................... | B62J 99/00 224/414 |
| 5,170,981 A | * | 12/1992 | Lin ......................... | B62J 11/00 224/414 |
| 5,326,006 A | * | 7/1994 | Giard, Jr. ................ | B62J 11/00 215/387 |
| 5,664,718 A | * | 9/1997 | Vine ....................... | B60N 3/103 224/413 |
| 6,059,245 A | * | 5/2000 | Hermansen ............. | B62J 11/00 248/311.2 |
| 6,216,929 B1 | | 4/2001 | Bonard et al. | |
| D502,366 S | * | 3/2005 | Strepkoff ....................... | 220/741 |
| 7,798,380 B2 | * | 9/2010 | Chekroune ............. | A45F 5/02 224/148.4 |
| 8,231,094 B1 | * | 7/2012 | Barnes, Jr. ......... | A47G 23/0225 224/148.4 |

(Continued)

FOREIGN PATENT DOCUMENTS

WO   WO 03/084805   10/2003

OTHER PUBLICATIONS

International Search Report and Written Opinion of the International Searching Authority (US), dated Jul. 12, 2012.

(Continued)

*Primary Examiner* — Christopher E Garft
(74) *Attorney, Agent, or Firm* — Nexsen Pruet, LLC; Todd A. Serbin

(57) ABSTRACT

A magnetic bottle mounting system, comprising: a bottle; a magnetically active ring; an at least partially open-faced mount for receipt of the bottle therein; and, at least one magnetically active body provided to the mount opposite the ring.

11 Claims, 11 Drawing Sheets

(56) References Cited

U.S. PATENT DOCUMENTS

| | | | | |
|---|---|---|---|---|
| 2001/0054817 | A1* | 12/2001 | Kelley | B42D 15/00 283/70 |
| 2004/0108337 | A1* | 6/2004 | Makino | A47K 5/12 222/183 |
| 2004/0173719 | A1 | 9/2004 | Mitchell | |
| 2004/0195254 | A1* | 10/2004 | Bunkers | G09F 23/08 220/739 |
| 2005/0229449 | A1* | 10/2005 | Shepley | G09F 3/20 40/306 |
| 2006/0118507 | A1* | 6/2006 | Feldman | B65D 23/0871 215/12.1 |
| 2007/0240336 | A1* | 10/2007 | Richardson | A43B 1/0054 36/101 |
| 2008/0210586 | A1* | 9/2008 | Didio | G09F 3/005 206/457 |
| 2011/0042435 | A1 | 2/2011 | Weng et al. | |
| 2011/0147424 | A1* | 6/2011 | Brown | B60N 3/103 224/441 |

OTHER PUBLICATIONS

IPEA/US; International Preliminary Report on Patentability for PCT/US2012/036185; May 24, 2013.

* cited by examiner

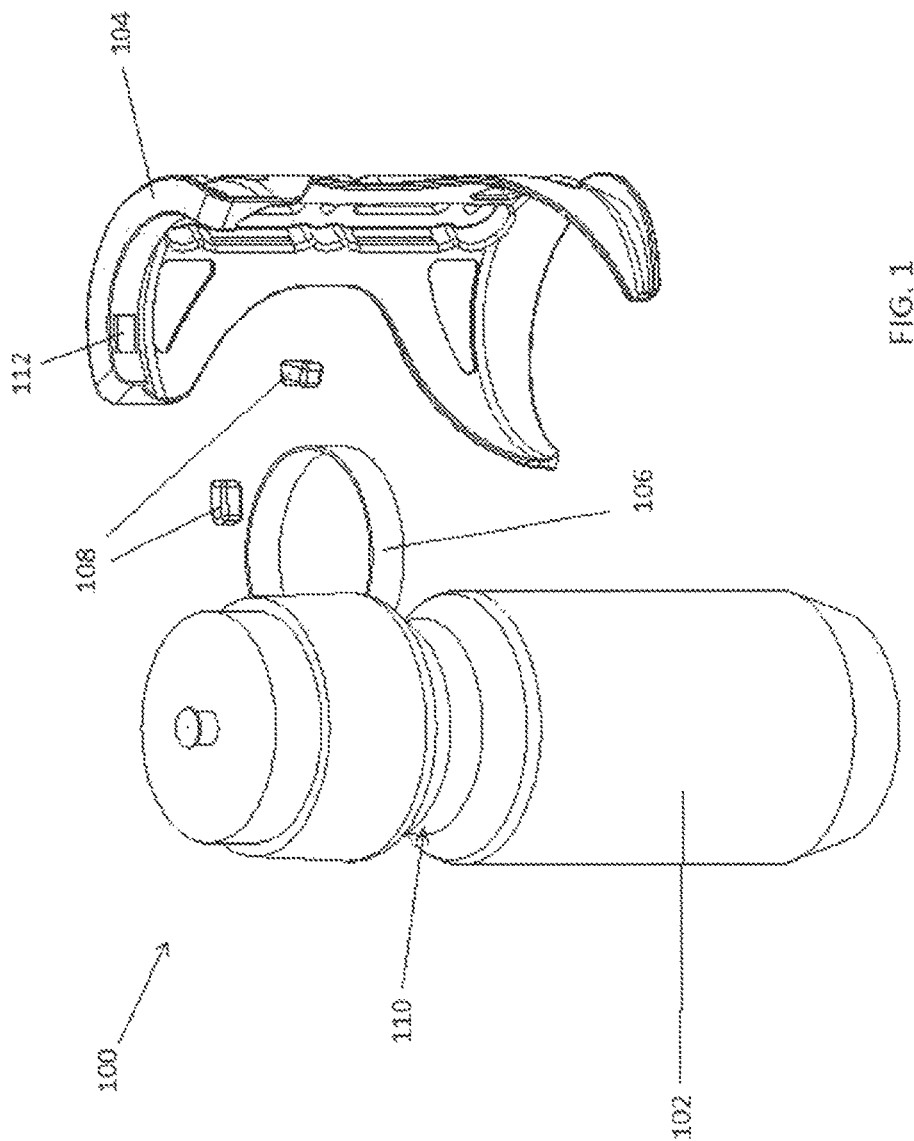

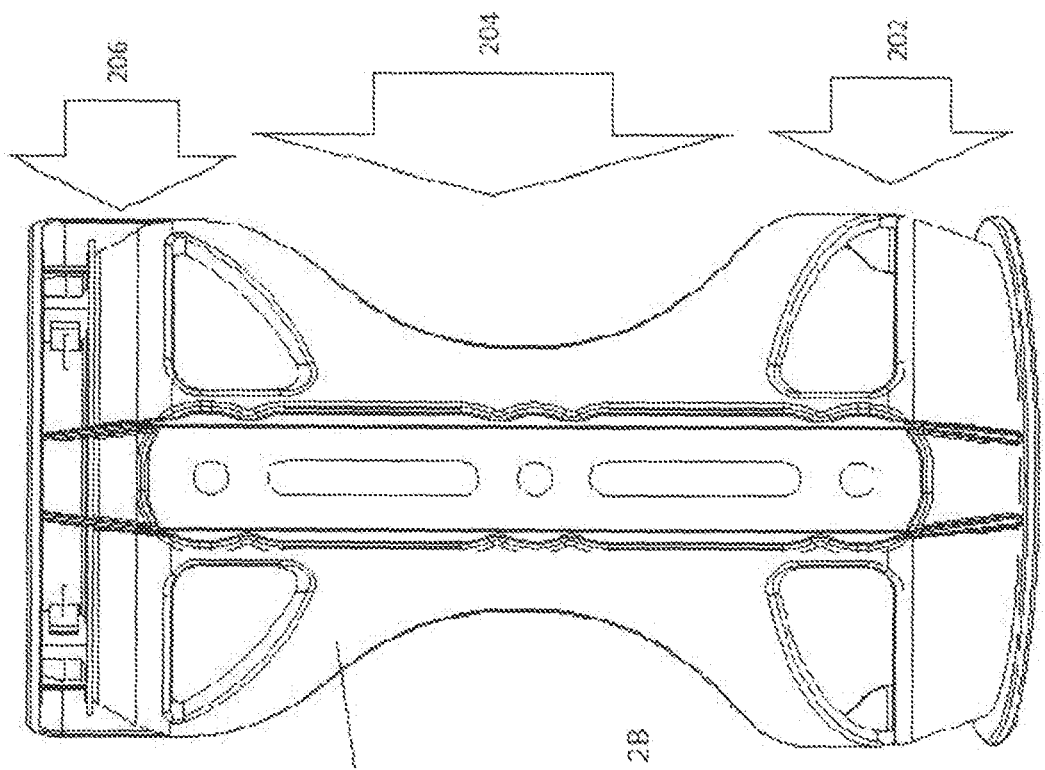
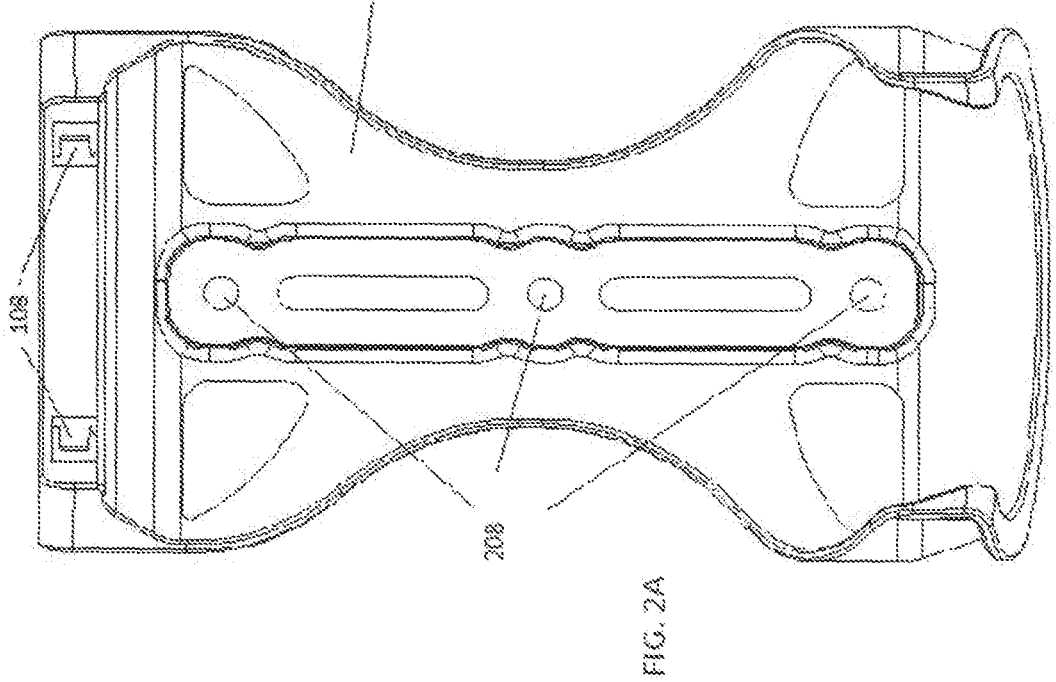
FIG. 2B
FIG. 2A

MAGNETIC BOTTLE MOUNTING SYSTEM AND METHODS OF USE

RELATED APPLICATIONS

This application claims the benefit of priority under 35 U.S.C. 119(e) of: U.S. Provisional Patent Application Ser. No. 61/518,174 filed May 2, 2011; U.S. Provisional Patent Application Ser. No. 61/571,254 filed Jun. 23, 2011; and, U.S. Provisional Patent Application Ser. No. 61/631,674 filed Jan. 9, 2012; the contents of all of which are incorporated herein by reference in their entirety.

FIELD AND BACKGROUND OF THE INVENTION

The present invention, in some embodiments thereof, relates to cycling and, more particularly, but not exclusively, to a bicycle accessory.

Traditional bottle mounting systems require that the bottle be placed or taken out of the bottle cage from a vertical direction. Because bottle cages are affixed to bicycles, in the area directly underneath the cross bar of the bicycle frame, the physical act of taking a bottle from its cage is a cumbersome, uncomfortable, distracting and perhaps unsafe depending upon circumstances.

Vincero Design of Boulder, Colo. has created a system of customized magnetic bottles to be used with a corresponding magnetic mount designed to avoid having to insert a water bottle into a traditional bottle cage. Description of the Vincero system can be found at www.vincero-design.com.

SUMMARY OF THE INVENTION

According to an aspect of some embodiments of the present invention there is provided a bottle mount system which uses an at least partially open-faced, magnetic mount to effectuate easier removal and insertion of a bottle. In some embodiments of the invention, the bottle is fitted with a magnetically active ring which magnetically interacts with the mount. In an embodiment of the invention, the mount is comprised of a neck with arms which are shorter than arms provided to a base, thereby creating a funnel-like shape with the more open end towards the top of the mount for focusing insertion of the bottle and allowing for removal of the bottle along multiple axes and directions.

In an embodiment of the invention, the bottle is rotationally and magnetically symmetric and thus can be inserted into the mount in any orientation around the bottle's longitudinal axis.

In an embodiment of the invention, a combination of magnetic attraction and mechanical cradling are used to removably attach the bottle to the mount. Optionally, magnetic attraction is between the ring and the neck of the mount. Alternatively, additionally and/or optionally, magnetic attraction is between the bottom of the bottle and the base of the mount. In some embodiments of the invention, the bottom of the bottle is mechanically cradled by the lower arms of the mount. Alternatively, additionally and/or optionally, the groove of the bottle is mechanically supported by the upper arms of the mount.

According to an aspect of some embodiments of the present invention there is provided a method of removing a bottle from an at least partially open-faced, magnetic bottle mount. In an embodiment of the invention, the bottle is pulled by the user from the upper portion of the bottle and away from the mount to break the magnetic attraction between the bottle and the mount. The bottle is removed from the mount by sustained movement by the user of the bottle away from the mount in a fulcrum-like movement around the base using the length of the bottle as a lever.

There is thus provided in accordance with an exemplary embodiment of the invention, a magnetic bottle mounting system, comprising: a bottle; a magnetically active ring placed around the circumference of the bottle; an at least partially open-faced mount adapted for receipt of the bottle therein; and, at least one magnetically active body provided to the mount opposite the ring.

In an embodiment of the invention, the bottle is at least one of rotationally and magnetically symmetrical.

In an embodiment of the invention, the mount comprises a base portion, a neck portion and a stem portion between the neck and base portions. In an embodiment of the invention, the neck is provided with an upper set of arms and the base is provided with a lower set of arms longer than the upper set of arms. In an embodiment of the invention, the at least one magnetically active body is embedded in the upper set of arms.

In an embodiment of the invention, the at least one magnetically active body is an arc magnet.

In an embodiment of the invention, the mount is provided with at least one bolt hole for securing the mount to an object.

In an embodiment of the invention, the mount is provided with at least one vertical slot for securing the mount to an object.

In an embodiment of the invention, the mount is provided with at least one spring-loaded device for securing the mount to an object.

In an embodiment of the invention, the bottle is provided with a groove in which the ring sits. Optionally, a portion of the mount mechanically cradles the bottle at the groove.

In an embodiment of the invention, the system further comprises a magnetically active annular ring on a bottom of the bottle and a magnetically active mount base support located on a base of the mount opposite the annular ring.

In an embodiment of the invention, the mount is divided into two adjustably separable parts. Optionally, the separable parts are provided with at least a pair of rails which nest such that a larger rail slides over a smaller rail to provide relative movement of the separable parts.

There is thus provided in accordance with an exemplary embodiment of the invention, a method of removing a bottle from an at least partially open-faced, magnetic mount, comprising: pulling an upper portion of the bottle away from the mount through the at least partially open face to break a magnetic attraction between the bottle and the mount; and, sustaining movement of the bottle away from the mount using a base of the mount as a fulcrum and the length of the bottle as a lever.

In an embodiment of the invention, pulling is away from a neck of the mount.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example, are not necessarily to scale and are for purposes of illustrative discussion of embodiments of the invention. In this regard, the description taken with the drawings makes apparent to those skilled in the art how embodiments of the invention may be practiced.

In the drawings:

FIG. 1 is an exploded view of a magnetic bottle mounting system, in accordance with an exemplary embodiment of the invention;

FIG. 2A is a rear view of the bottle mount, in accordance with an exemplary embodiment of the invention;

FIG. 2B is a front view of the bottle mount, in accordance with an exemplary embodiment of the invention;

DESCRIPTION OF EXEMPLARY EMBODIMENTS OF THE INVENTION

Figure 3:
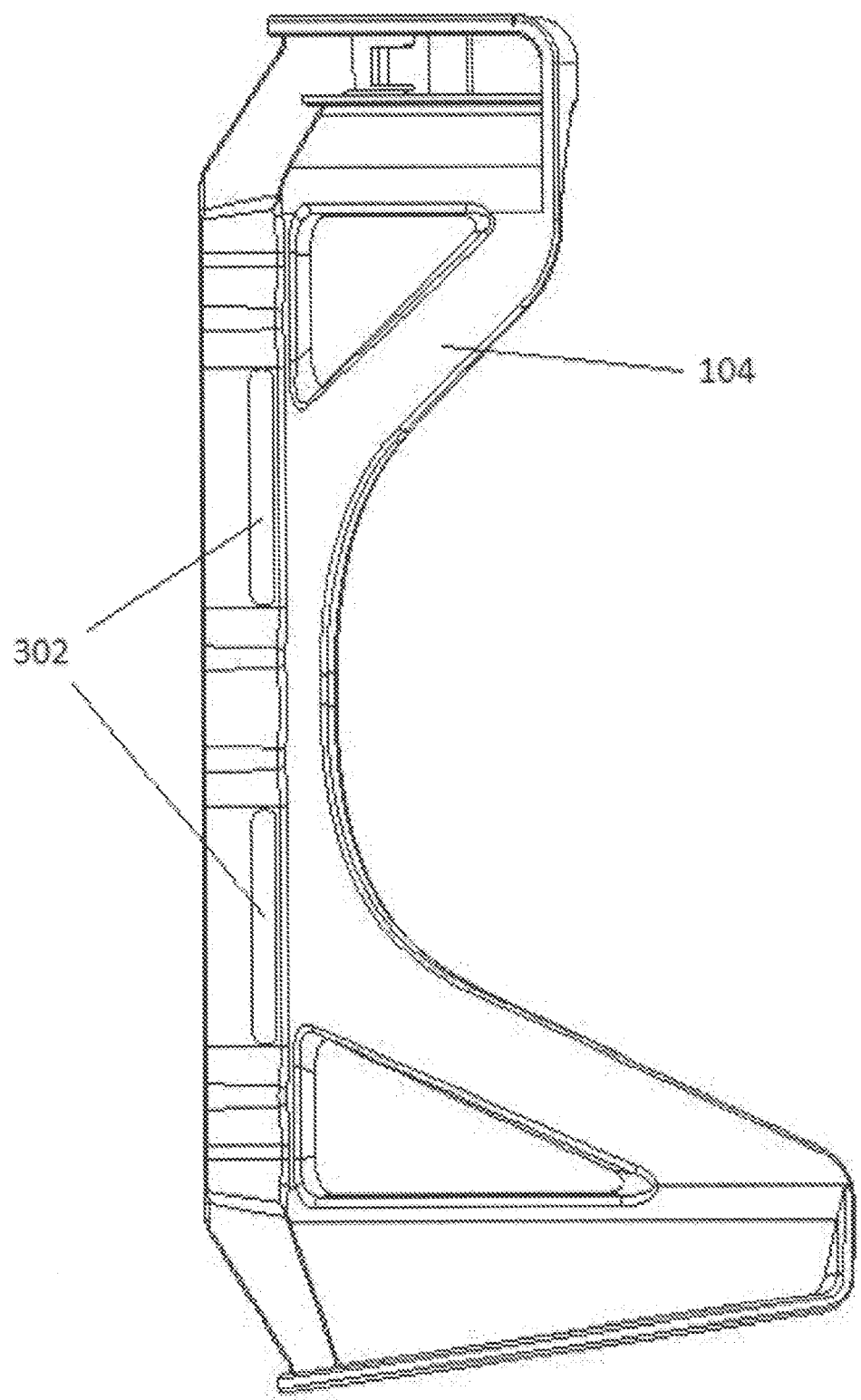
FIG. 3 is a side view of the bottle mount, in accordance with an exemplary embodiment of the invention.

The present invention, in some embodiments thereof, relates to cycling and, more particularly, but not exclusively, to a bicycle accessory. Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Referring now to the drawings, FIG. 1 is an exploded view of a magnetic bottle mounting system 100, in accordance with an exemplary embodiment of the invention. In an embodiment of the invention, the system 100 is comprised of a bottle 102, fitted with a magnetically active ring 106, and a bottle mount 104 adapted to fit with and act as a counterpart to the bottle 102. In an embodiment of the invention, the mount 104 is adapted to magnetically attract to ring 106 fitted on bottle 102, for example by being provided with at least one magnetically active body 108 oppositely charged from the ring 106. In some embodiments of the invention, because the bottle 102 is rotationally symmetrical, the bottle 102 is removably attachable to mount 104 in any rotational orientation around the longitudinal axis of the bottle 102. As a result, a user of the system 100 does not have to ensure that the bottle is properly aligned for attachment to the mount, which can be an issue when the user is in motion.

In an embodiment of the invention, bottle 102 is of a standard shape and/or size as is used in the sport of cycling. Examples of standard cycling bottle configurations include the Specialized® 24 oz. Big Mouth, 21 oz. Little Big Mouth and 22 oz. Purist WaterGate and Mo'Flo bottles. In some embodiments of the invention, the mount 104 is usable with a plurality of bottle sizes. For example, a single embodiment of the invention is capable of accommodating bottles from approximately 7 in. in height (not counting the cap) and approximately 9 in. in circumference (e.g. 21 oz. Specialized® Little Big Mouth) to approximately 8 in. in height (not counting the cap) and approximately 9 in. in circumference (e.g. 24 oz. Specialized® Big Mouth). In some embodiments of the invention, the mount 104 is approximately 6 inches long in its longitudinal axis. Optionally, mount 104 is provided in a plurality of sizes, varying in length, width and curvature to match 15 corresponding bottle sizes. These standard bottles are typically provided with a groove 110 which is conventionally used as a hand hold in order to provide an ergonomic interface between the bottle and a user's fingers and/or hand and also to interface with a lip of conventional bottle cages to mechanically keep the bottle in the cage. However in an embodiment of the invention, the groove 110 also functions as a site for positioning the magnetically active ring 106. In an embodiment of the invention, ring 106 is adapted to fit the groove 110 of a standard cycling bottle size. Optionally, multiple ring sizes are manufactured to correspond with the groove of multiple bottle sizes. Alternatively, additionally and/or optionally, at least one magnetically active ring 802 is located on the base of the bottle 102, as shown and described in more detail with respect to FIG. 8 and/or at a site around the circumference of bottle 102 other than at the groove 110.

In some embodiments of the invention, ring 106 is made from a magnetically active material, for example carbon steel or magnetic stainless steel. In order to increase the longevity and aesthetics of the ring 106, a coating which does not affect the magnetic properties of the ring 106 is optionally applied. Corrosion protection is achieved, in some embodiments of the invention, through plating or coating the ring 106 through such processes as powder coating, plating (i.e. nickel, zinc, chrome, etc.), passivation, pickling, physical vapor deposition (PVD), ceramic and/or Teflon® (polytetrafluoroethylene). Some or all of these processes will provide aesthetic appeal as well as corrosion protection. In some embodiments of the invention, the coating is magnetically active in addition to or alternatively to the ring 106 itself being magnetically active. While ring 106 is shown in FIG. 1 (and other Figures herein) as having a flat surface in the longitudinal axis direction of the bottle 102, it should be understood that the ring 106 could be angular, curved, and/or have multiple surfaces, for example for the purpose of matching the shape of the ring to the shape of the groove of the bottle on which it is used, so they fit properly together as counterparts. Optionally, the shape of the ring does not match the groove of the bottle on which the ring is used.

In some embodiments of the invention, because the bottle 102 is an industry standard size and/or shape, and inherently the bottle 102 is sufficiently flexible to be used as a "squeeze" bottle, the legacy standard cycling bottle can be retrofitted with ring 106 by sliding it over the top of the bottle 102 (with the lid screwed off) and elastically deforming the bottle's shape to move the ring 106 down into the groove 110. It is conceived by the inventor that bottles already owned by a cyclist can be adapted for use with the system 100 simply by purchasing and then adding the ring 106 to as many bottles as is desired, in an embodiment of the invention. It is similarly 20 conceived by the inventor that in a scenario where the number of rings 106 available to the cyclist is limited, a ring 106 can be moved from one bottle to another relatively easily and/or in a short amount of time, for example in under a minute, in some embodiments of the invention.

In some embodiments of the invention, ring 106 is attached to bottle 102 using an adhesive. In an alternative embodiment of the invention, the bottle is designed with an impression/cavity, for example at the base and/or on the cap, so that the ring is affixed to the bottle by snap fitting it to the bottle. Alternatively to the ring 106, additionally to the ring 106 and/or optionally, a magnetically active element is embedded into the bottle 102 during the manufacturing of the bottle 102 at a location that will position the magnetically active element opposite the magnetically active portion of the mount 104.

In an embodiment of the invention, system 100 is designed so that bottle 102 is held to mount 104 by at least one of: (1) the shape of the magnetic bottle mount 104 (i.e. the mount 104 cradles at least a portion of the bottle 102); and, (2) the force of the magnetic attraction between the ring 106 and/or bottle 102 and the magnetically active body 108 housed inside the mount 104. FIG. 2A is a rear view of the bottle mount 104 and FIG. 2B is a front view of the bottle mount 104, in accordance with an exemplary embodiment of the invention. In an embodiment of the invention, mount 104 is configured with an open face such that at least a portion of the mount 104 is open and obstruction-free. This is an advantage over conventional water bottle cage designs. For example, the curvature/arc of the mount 104 in combination with the length of the arms of the mount 104 is designed to allow the bottle 102 to be removed from and/or placed in the mount 104 from the side (left or right), the top and/or even head-on. Exemplary mount 104 curvature and the open face is shown and described in more detail with respect to FIGS. 4A and 4B. This is a significant departure from conventional water bottle cages which only allow the bottle to be secured into the cage from only a vertical to quasi-vertical direction.

In an embodiment of the invention, mount 104 is comprised of the base 202, the stem 204 and the neck 206. The base 202 is the portion of the mount 104 that comes into contact with the lower portion 502 of the bottle 102, shown in more detail with respect to FIGS. 5A and 5B, and bottom 504 of the bottle 102. In an embodiment of the invention, the stem 204 is the portion of the mount that contains the bolt holes 208. The neck 206 is the area of the mount 104 that comes into contact with the upper portion 506 of the bottle 102, shown in more detail with respect to FIGS. 5A and 5B, of the bottle 102. It should be understood that these identified segments of mount 104 are for ease of explanation only and that the segments optionally blend together and in some embodiments overlap, for example a bolt hole 208 could be located in the base 202 and/or neck 206. In some embodiments of the invention, less or more than three (3) bolt holes 208 are provided to mount 104. It should be understood that depending on the embodiment of the invention, mechanical cradling and/or magnetic attraction are used solely or in combination and that each method can be used solely or in combination at each contact point between the bottle 102 and the mount 104 regardless of whether in the base, stem or the neck.

In an embodiment of the invention, at least one magnetically active body 108 is located in the neck 206 of the mount 104. Optionally, the body 108 is positioned within a cavity 112. The cavity 112 is designed with a shape to house the at least one magnetically active body 108, optionally an arc magnet shaped with a flat surface facing the ring 106 and/or a curvature that substantially matches the curvature of the mount 104 and/or the outer circumference of the ring 106 or bottle 102.

The stem 204 of the mount 104 has at least one bolt hole 208 and/or at least one vertical slot 302, described and shown in more detail with respect to FIG. 3, in an embodiment of the invention. In an embodiment of the invention, the at least one bolt hole 208 is configured to fit a standard bolt hole size used with bicycles. Optionally, alternative fastening mechanisms, such as screws and/or snap fit clips are used to hold the mount 104 to whatever it is being attached to. In some embodiments of the invention, the mount 104 is fastened magnetically to an object (e.g. the metal surface of a moped or motor cycle frame), for example where the mount 104 is provided with at least one rearward facing magnetically active body. In some embodiments of the invention, the at least one bolt hole 208 is not perfectly circular, but elongated, to allow for slight sliding of the mount 104 along the bicycle frame. Optionally, the sliding of this embodiment is dampened, for example using a spring. In some embodiments of the invention, a spring-loaded device connects the system 100 to the bicycle, rather than the system 100 being directly affixed to the bicycle frame. This spring-loaded connection allows the system 100 a limited degree of upward and downward (vertical) movement while attached to the bicycle, absorbing outside forces and vibration.

In an embodiment of the invention, the system 100 is configured so that the counterparts, the bottle 102 and the mount 104, function similarly to a fulcrum during bottle 102 removal. As described elsewhere herein, the mount 104 is bolted to the bicycle and the bottle 102 recesses into the base 202 of the mount 104 while being held at the neck 206 by magnetic forces. In an embodiment of the invention, the bottle 102 is removed by grasping the upper portion 506 of the bottle 102 and tilting and/or pulling it up, backward and/or to a side. As the bottle 102 is pulled from the mount 104, the lower portion 502 of the bottle 102 pivots on the mount's 104 base 202. This fulcrum action promotes leverage, enabling the user to overcome the force of the magnets. In an embodiment of the invention, the fulcrum effectuating configuration is also enhanced by the shape of the neck 206 and base 202 of the mount 104, described and shown in more detail with respect to FIG. 3 and FIGS. 4A and 4B.

FIG. 3 is a side view of the bottle mount 104, in accordance with an exemplary embodiment of the invention. In some embodiments of the invention, each side of the mount 104 substantially reflects the other. In some embodiments of the invention, mount 104 is provided with at least one vertical slot 302 adapted for passage therethrough of a strap (e.g. a hook and loop fastener), snap-fit adapter, tie, clip, zip tie, and/or string, as examples. In an embodiment of the invention, mount 104 is fastened to a bicycle using straps, ties or clips which pass through the at least one vertical slot 302 and around a part of the bicycle frame. In some embodiments of the invention, the at least one vertical slot 302 renders the system 100 portable, allowing system 100 to be removably fastened to devices such as: a waist belt or arm band; a backpack; a stroller; a wheelchair; a walker; a vehicle; as specific examples, or anything that can be strapped, tied, or clipped to, generally.

Figure 4B:
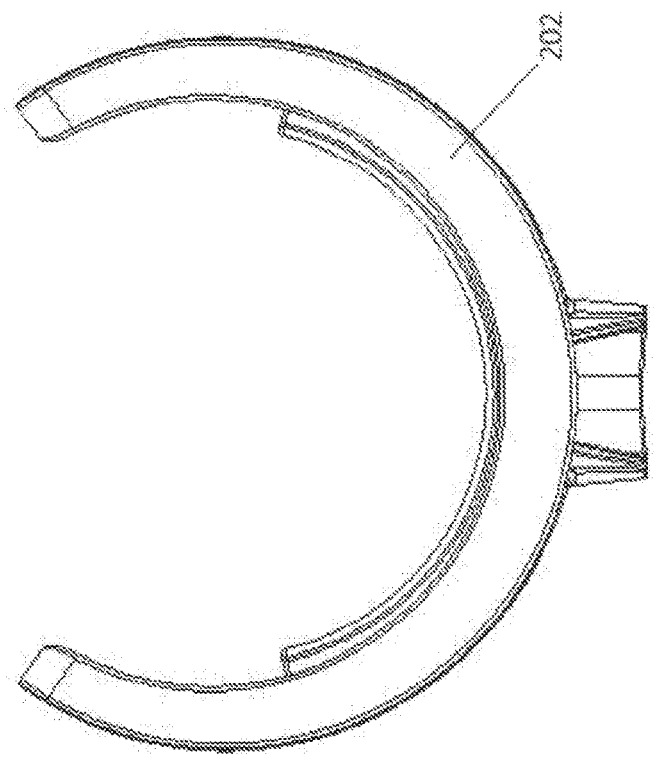
FIG. 4B is a bottom view of the bottle mount, in accordance with an exemplary embodiment of the invention.
Figure 4A:
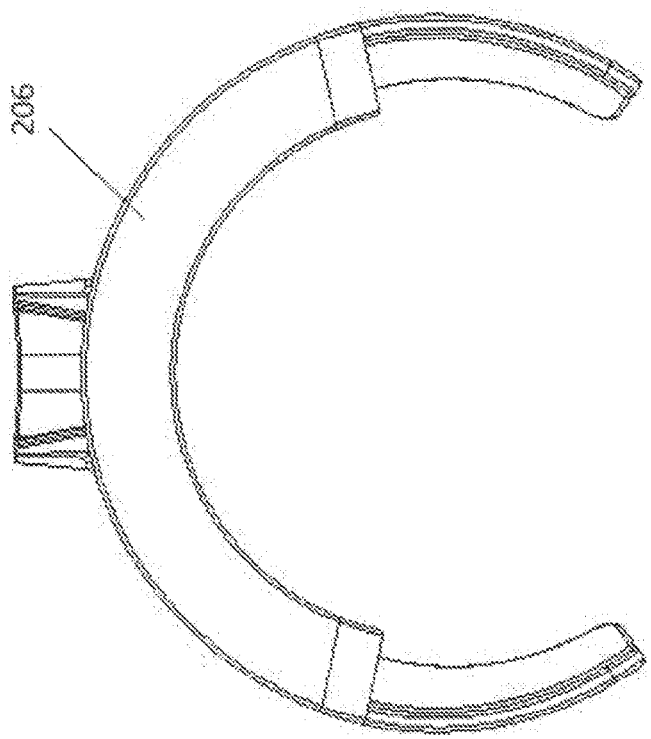
FIG. 4A is a top view of the bottle mount, in accordance with an exemplary embodiment of the invention.

In some embodiments of the invention, the arms of the neck portion 206 are shorter than the arms of the base portion 202 allowing for the easier insertion and/or removal of the bottle 102 into the upper portion 506 of the mount 104 while still providing sufficient structure at the lower portion 502 of the mount 104 for cradling the bottle 102. In an embodiment of the invention, the shorter upper arms and the longer lower arms create a funnel-like opening with more bottle 102 maneuvering space at the neck 206 and less at the base 202 of the mount 104. FIG. 4A is a top view of the bottle mount 104 and FIG. 4B is a bottom view of the bottle mount 104, in accordance with an exemplary embodiment of the invention. In some embodiments of the invention, the base portion 202 has a larger circumference than the upper portion 506, in essence providing a configuration whereby the upper arms are shorter than the lower arms. In some embodiments of the invention, the base portion 202 has a circumference greater than 180 degrees and the neck portion 206 has a circumference less than 180 degrees.

Figure 5A:
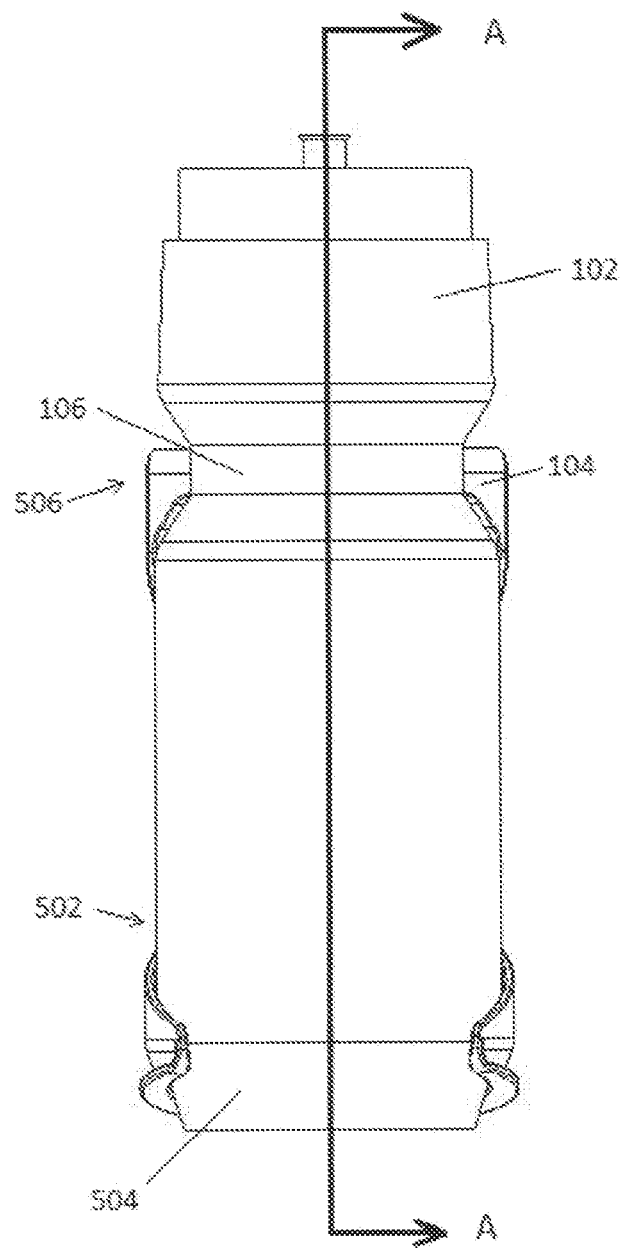
FIG. 5A is a front view of the assembled magnetic bottle mounting system, in accordance with an exemplary embodiment of the invention.
Figure 5B:
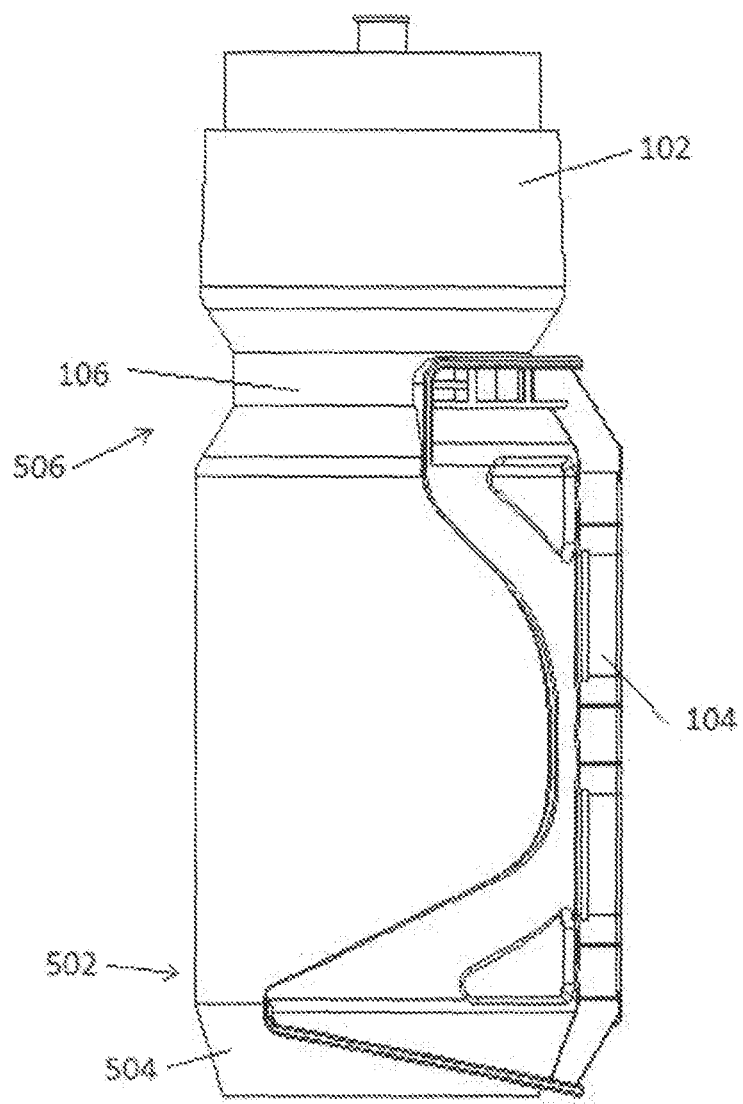
FIG. 5B is a side view of the assembled magnetic bottle mounting system, in accordance with an exemplary embodiment of the invention.
Figure 5C:
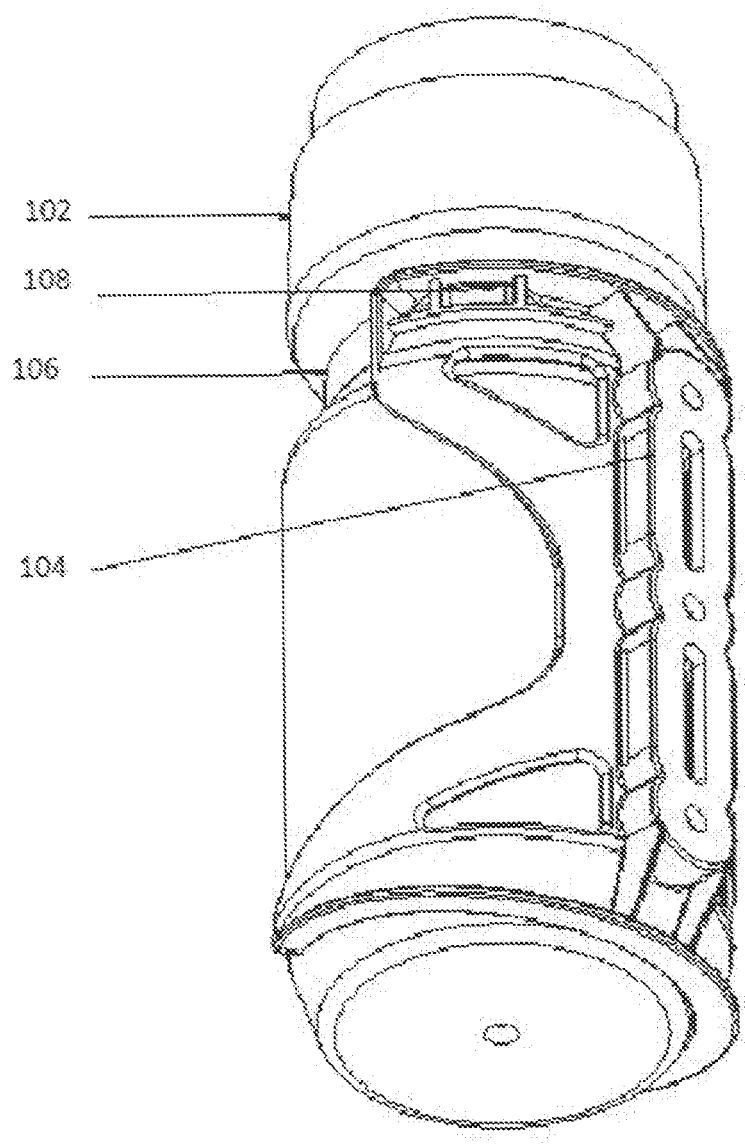
FIG. 5C is a perspective rear view of the assembled magnetic bottle mounting system, in accordance with an exemplary embodiment of the invention.
Figure 6:
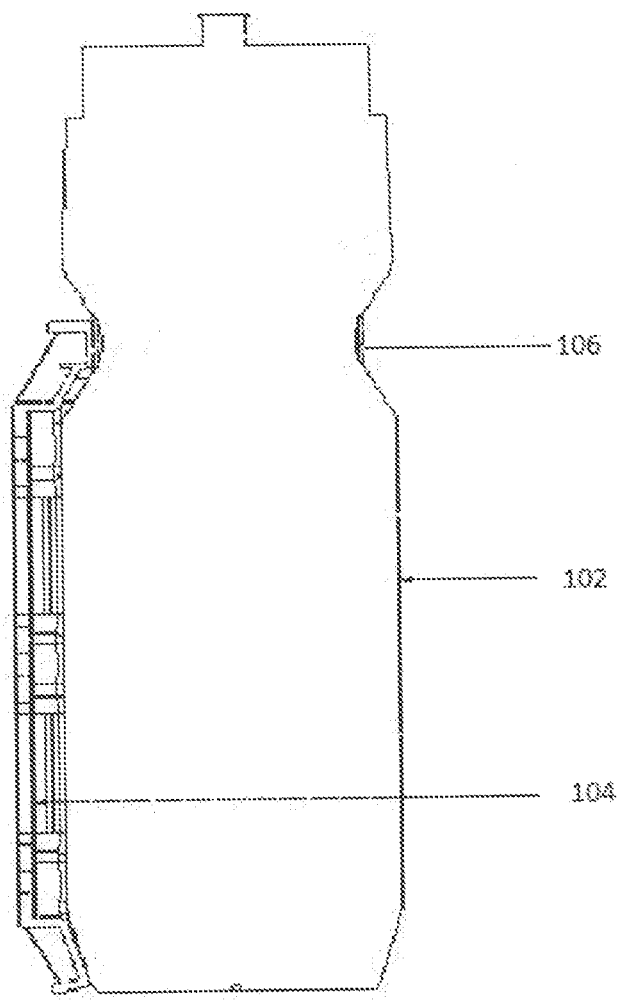
FIG. 6 is a cross-sectional side view of the assembled magnetic bottle mounting system, in accordance with an exemplary embodiment of the invention.

FIGS. 5A-5C are a front view, a side view and a perspective rear view of the assembled magnetic bottle mounting system 100, respectively, in accordance with an exemplary embodiment of the invention. FIG. 5A shows the cross-sectional cut of FIG. 6 which is a cross-sectional side view of the assembled magnetic bottle mounting system 100, in accordance with an exemplary embodiment of the invention.

Figure 7:
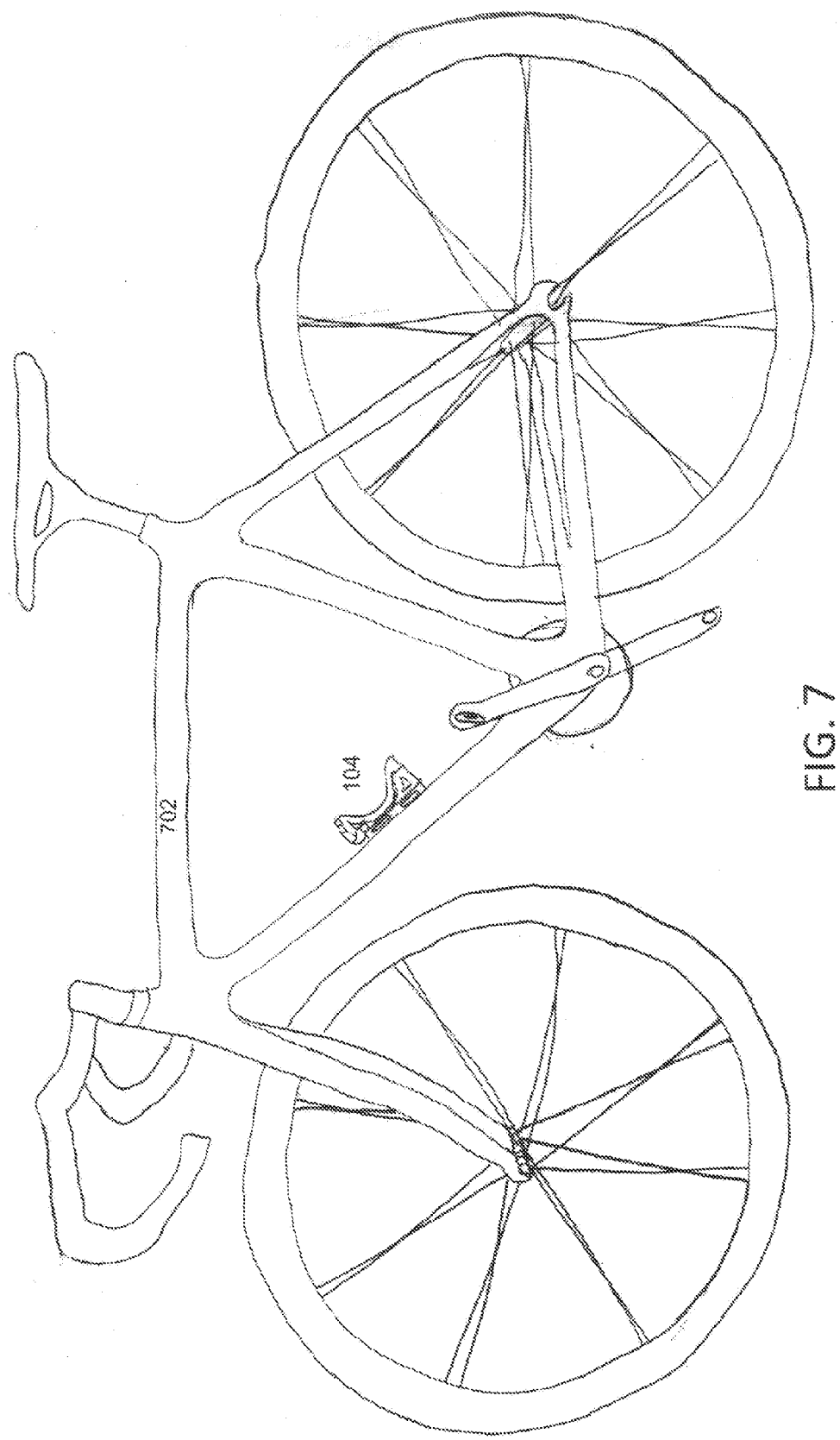
FIG. 7 is a view of the magnetic bottle mounting system installed on a bicycle, in accordance with an exemplary embodiment of the invention.

FIG. 7 is a view of the mount 104 of the magnetic bottle mounting system 100 installed on a bicycle 702, in accordance with an exemplary embodiment of the invention.

In an embodiment of the invention, mount 104 is made from a material which is sufficiently rigid to mechanically hold the bottle 102 while still being able to withstand the repetitive shock of being mounted on a moving object. Exemplary construction materials include various types of plastic, metal, wood, woven material (e.g. carbon fiber), or rubber. Exemplary materials for the at least one magnetically active body 108 include rare earth, flexible, ceramic, alnico, samarium cobalt, and neodymium iron boron magnets. The mount 104 is manufactured by injection molding, casting, dies and stamping, press-fitting, wire bending/shaping, custom machining using a CNC mill and lathe and/or by forming carbon.

Figure 8:
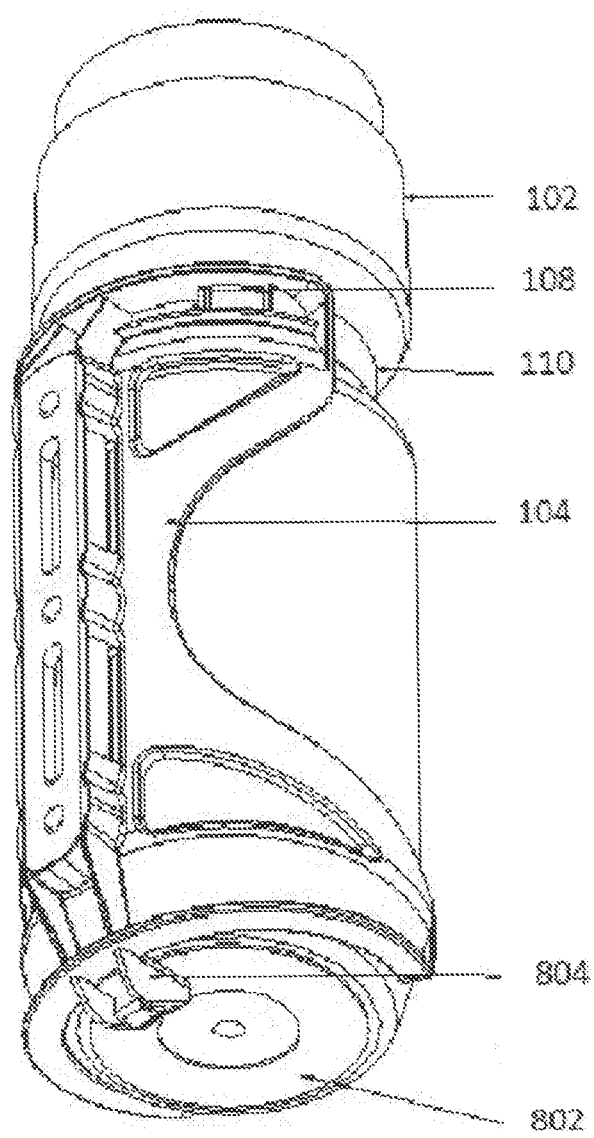
FIG. 8 is a rear perspective view of a magnetic bottle mounting system including a magnetically active annular ring on the bottom of the bottle, in accordance to with an exemplary embodiment of the invention; and, FIG. 9 is a flowchart of a method of removing a bottle from an at least partially open-faced, magnetic mount, in accordance with an exemplary embodiment of the invention.

FIG. 8 is a rear perspective view of a magnetic bottle mounting system 800 including a magnetically active annular ring 802 on the bottom of the bottle 102, in accordance with an exemplary embodiment of the invention. In some embodiments of the invention, mount 104 is provided with a magnetically active counterpart to the annular ring 802. In an embodiment of the invention, the magnetically active counterpart is embedded in a mount base support 804 located opposite the annular ring 802. Optionally, the mount base support 804 renders mechanical support to the bottle 102 as well as magnetic attraction.

In some embodiments of the invention, magnets and metal counterparts are juxtaposed, for example, metal elements are located on the mount while magnetic elements are located on the bottle. Optionally, the metal elements and magnetic elements are mixed, wherein at least one metal element is located on the bottle and at least one magnetic element is located on the bottle, with corresponding counterparts located on the mount.

In an embodiment of the invention, the neck, base and stem of the mount contain magnets and at least corresponding portions of the bottle are lined with metal (such wire mesh), for example by embedding the metal into the bottle during the manufacturing process.

In an embodiment of the invention, at least one magnetically active body is free standing (i.e. not press fitted or embedded into a corresponding cavity) and is affixed on an external surface of the mount.

In some embodiments of the invention, the mount is adjustable such that the distance between the base and the neck can be lengthened or shortened. An adjustable mount would allow for use with varying sizes of water bottles. In an embodiment of the invention, the adjustable mount is partitioned in the middle of the stem. The stem is configured with at least one rail on each corresponding half of the stem, with one side having a different size than the other such that the larger rail slides over the smaller rail (or from a different perspective, the smaller rail nests within the larger rail to and slides within the larger rail), in an embodiment of the invention. In an embodiment of the invention, with the pieces bolted to the bike, the rails would remain in place. In an embodiment of the invention, at least one vertical slot would reside on the base 202 and at least one vertical slot would reside on the neck 206 of the mount.

In some embodiments of the invention, an adjustable mount is provided wherein the neck 206 of the mount 104 is adapted to hold the cap of the bottle 102 instead of at the groove 110. In an embodiment of the invention, the neck 206 moves relative to the base 202 thereby shortening or lengthening the overall length of the mount 104. In an embodiment of the invention, various bottle lengths are thus accommodated by the mount 104 by shortening or lengthening the mount 104, using for example, the sliding rail configuration described above.

In some embodiments of the invention, a bottle is provided to the mount which also has a groove located near the lower portion of the bottle to interface with the base of the mount in a similar fashion to how the groove of the upper portion of the bottle interacts with the neck of the mount. Optionally, magnetically active counterparts are provided to the lower groove and the base of the mount.

Figure 9:
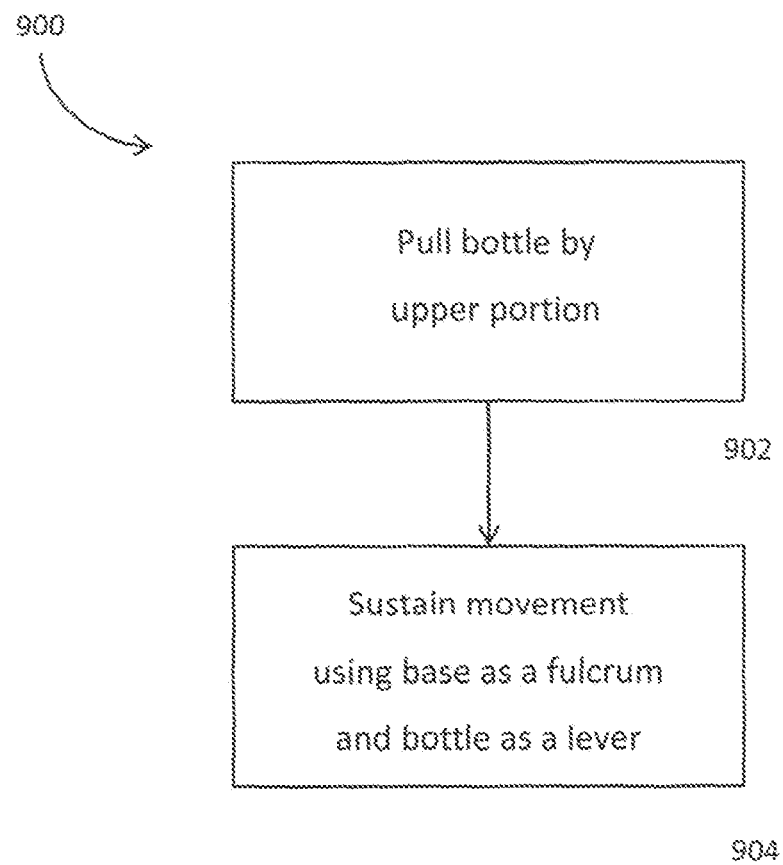

FIG. 9 is a flowchart 900 of a method of removing a bottle from an at least partially open-faced, magnetic mount, in accordance with an exemplary embodiment of the invention. In an embodiment of the invention, the bottle 102 is pulled (902) by the user from the upper portion 506 of the bottle and away from the mount 104 through the at least partially open face to break the magnetic attraction between the bottle 102 and the mount 104. The bottle is removed from the mount 104 by sustaining movement (904) by the user of the bottle 102 away from the mount 104 in a fulcrum-like movement around the base 202 and using the length of the bottle 102 as a lever.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references 10 unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A magnetic bottle mounting system, comprising:
an elastically deformable bottle with a first circumference representing the largest circumference of the bottle, the bottle provided with a groove of a third circumference, smaller than the first circumference, and on either side of which the bottle is the first circumference;
a rigid and permanently shaped magnetically active ring with a second circumference, the entirety of the ring of the second circumference being smaller than the first circumference and larger than the third circumference, removably placed around the bottle in the groove and interchangeably usable with a plurality of bottles;
an at least partially open-faced mount configured with a neck portion having arms forming an arc with an arc angle less than 180 degrees and a base portion having arms forming an arc with an arc angle greater than 180 degrees and adapted for receipt of the bottle therein; and,
at least one magnetically active body provided to the mount opposite the ring,
where the bottle is removably secured to the mount both magnetically by the interaction between the ring and the magnetically active body and mechanically by the at least partially open face of the mount wrapped around the bottle.

2. A system according to claim 1, wherein the bottle is at least one of rotationally and magnetically symmetrical.

3. A system according to claim 1, wherein the mount comprises a stem portion between the neck and base portions.

4. A system according to claim 1, wherein the at least one magnetically active body is an arc magnet.

5. A system according to claim 1, wherein the mount is provided with at least one bolt hole for securing the mount to an object.

6. A system according to claim 1, wherein the mount is provided with at least one vertical slot for securing the mount to an object.

7. A system according to claim 1, wherein a portion of the mount mechanically cradles the bottle at the groove.

8. A system according to claim 1, wherein the at least one magnetically active body is embedded in the upper set of arms.

9. A system according to claim 1, further comprising a magnetically active annular ring on a bottom of the bottle and a magnetically active mount base support located on a base of the mount opposite the annular ring.

10. A system according to claim 1, wherein the bottle is interchangeably usable with a plurality of magnetically active rings.

11. A system according to claim 1, further comprising a plurality of bottles interchangeably usable with a plurality of magnetically active rings all of which are compatible with the mount.

* * * * *